Feb. 22, 1949.  C. M. SANTEE  2,462,557
HEAT PUMP MEANS FOR CONTROLLING THE TEMPERATURE
OF THE WALLS OF A ROOM
Filed Oct. 8, 1947  2 Sheets-Sheet 1
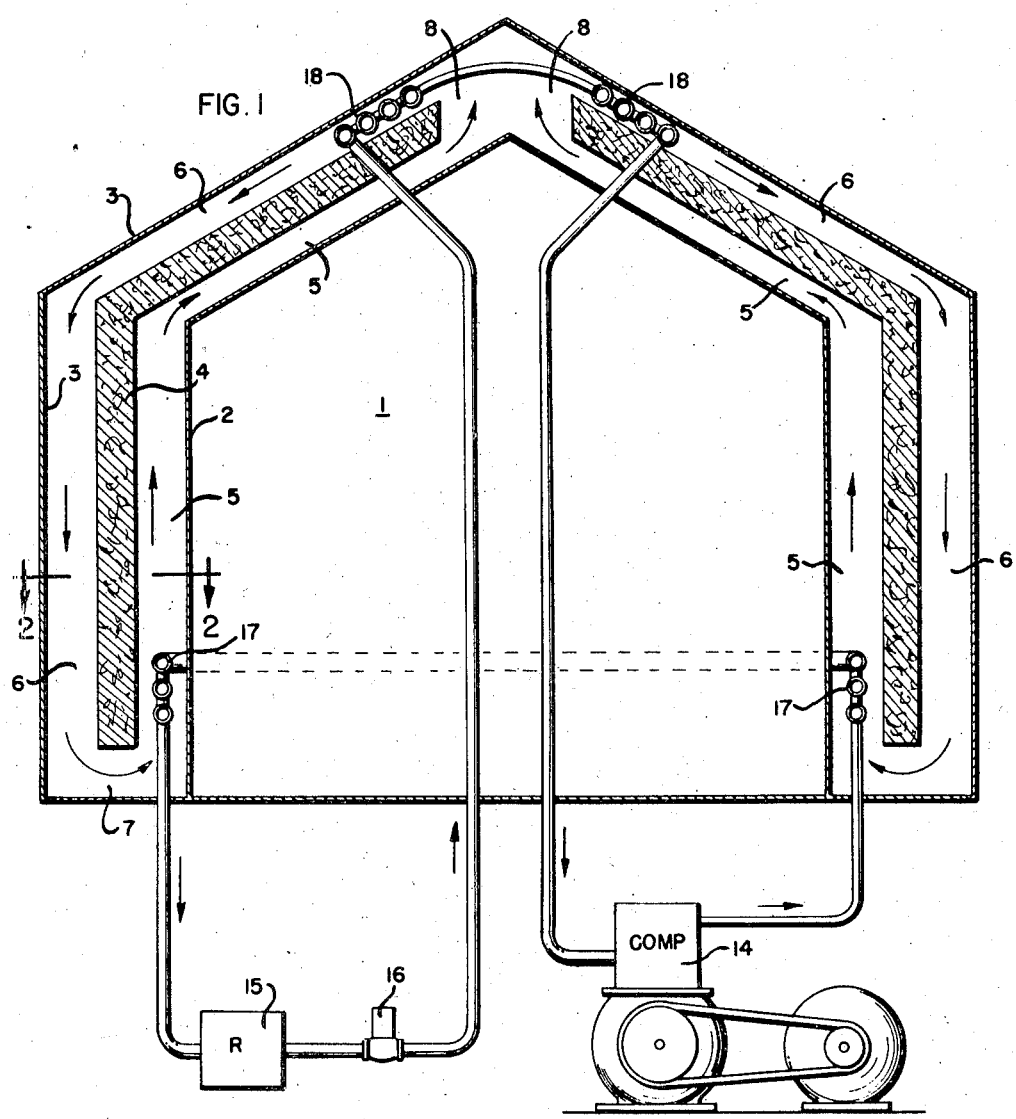
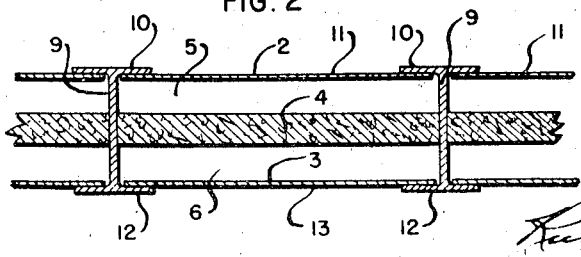
INVENTOR,
CARL M. SANTEE
BY
ATTORNEYS Patented Feb. 22, 1949

2,462,557

UNITED STATES PATENT OFFICE 2,462,557

HEAT PUMP MEANS FOR CONTROLLING THE TEMPERATURE OF THE WALLS OF A ROOM

Carl M. Santee, Dixon, Ill.

Application October 8, 1947, Serial No. 778,702

3 Claims. (Cl. 62—129)

This invention relates to methods and means for controlling the temperature of an occupied space, such as the interior of a room or building, especially by means of a heat pump mechanism utilizing the refrigeration cycle for the function of directing heat to and from an occupied space.

The main objects of this invention are to provide an improved method and structure for applying directly to the walls of a building the functions of absorption and discharge of heat by a heat pump; and to promote the comfort of the occupants of the building by controlling the temperature of its walls, so as to prevent uncontrolled leakage of heat through the walls from interfering with the efficiency or effectiveness of the air movements that are incidental to the operation of the heat pumping equipment directing heat to or from the space within the building.

A further object of the invention is to provide an improved form of heat pump arrangement whereby the temperature of a room or building may be selectively controlled either by controlling the temperature of its walls, or by controlling the temperature of air circulated within the room or building, or by controlling the temperatures of the walls and the circulated air in desired cooperative relation to each other.

A further object is to provide an improved construction for stopping heat leakage, or reversing the flow of heat in a wall by controlling interior and exterior wall surface temperatures independently.

Some of the functions accomplished by the invention are the following:

1. It enables the room heat to be circulated without loss to the outside air.
2. It facilitates picking up additional heat from the outside air and introducing it into the occupied space when needed.
3. It can operate to maintain interior wall temperature at or above the room air temperature to provide greater comfort.
4. It permits the operation of refrigeration cycle machinery for heating at high efficiency and low power input with a high seasonal coefficient of performance and low seasonal cost of operation.

Two specific embodiments of the invention are illustrated in the drawings in simple diagrammatic form with a view to disclosing the improved wall construction in its relation to heat pump apparatus utilizing the reversible refrigeration cycle.

Figure 1 shows a form of the invention in which heat exchangers, functioning respectively as condenser and evaporator elements of a heat pump, are incorporated directly in the hollow walls of the building.

Fig. 2 is a transverse section taken on the line 2—2 of Fig. 1.

Figure 3:
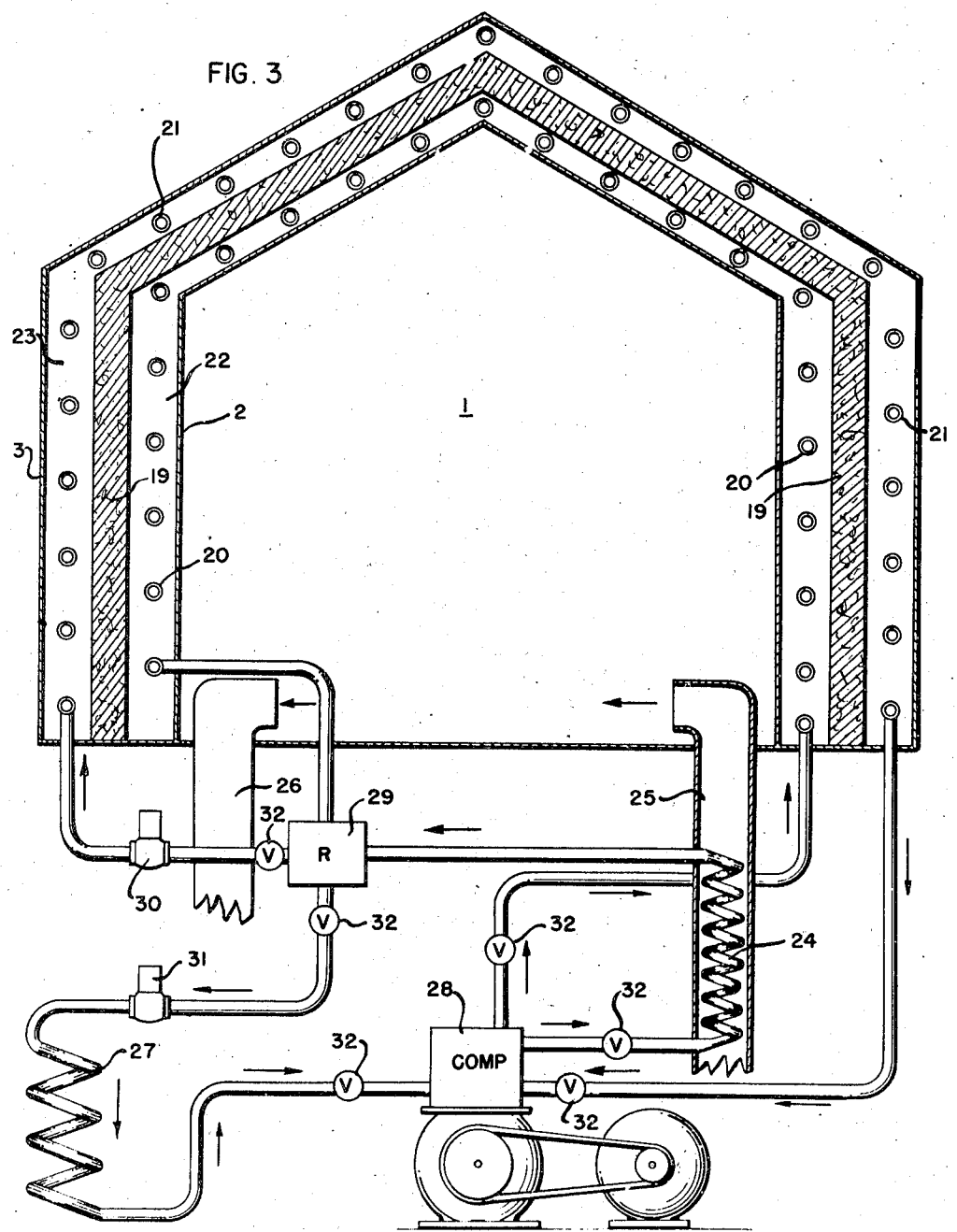
Fig. 3 is a similar view of a somewhat modified embodiment wherein the heat pump functions to control the temperature of air circulated through the occupied space in addition to controlling the transfer of heat by means of the wall structure.

It is to be understood that the extremely simple diagrammatic illustration of the refrigeration apparatus is typical generally of any form of heat pump mechanism, either reversible or non-reversible, as may be appropriate for some particular installation and that for simplicity and clearness no attempt is made in the drawings to illustrate the expedients for reversing the cycles or other refinements which are now well understood in the art.

In the form shown in Fig. 1, the occupied space 1 is provided wholly or in part with hollow walls comprising an inner wall 2, an outer wall 3 with an intermediate panel structure 4 defining an inside air duct 5, and an outside air duct 6. The air ducts 5 and 6 communicate with each other below the panel 4 through a passage 7 located in the lower portion of the wall and they also communicate with each other through a passage 8 above the panel 4 in the upper portion of the wall; thus providing for circulation of air within the walls, as indicated by arrow.

A suitable wall structure is shown in detail in Fig. 2 and comprises vertical members 9 of I-beam section having flanges 10 connected airtight with the panels 11 which make up the inside wall 2 and flanges 12 connected airtight to panels 13 which make up the exterior wall 3. The walls 2 and 3 may be of heat-conducting material but the interior panel 4 should be heavily insulated so as to minimize the transfer of heat through the wall 4 between the passages 5 and 6.

In Fig. 1 the heat pump mechanism is represented by a compressor 14, a receiver 15, an expansion valve 16 and heat exchangers 17 and 18 appropriately connected with piping to form a closed refrigerant circulation system.

As illustrated, the coils of the heat exchanger 17 serve as the condenser of the refrigeration mechanism and the coils 18 serve as the evaporator; and the piping is shown arranged for operation of the heat pump for the purpose of heating the occupied space 1.

In this embodiment, the air flowing within the walls would flow by convection, being heated by the coils of the condenser 17 and cooled by the coils of the evaporator 18. The cool air in the passage 6 will absorb heat through the outer walls 3, the heated air in the passage 5 will transmit heat through the inner wall 2 to the room, and the heavily insulated panel 4 reduces to a minimum the loss of heat between the relatively cold column of air in passage 6 and the relatively warm column of air in passage 5.

When the refrigeration cycle is reversed, as by means not shown but well known in the art, the heat exchanger 17 in the inner passage 5 operates as the evaporator to cool the column of air and absorb heat from the room and the heat exchanger 18 would serve as a condenser heating the air in the passage 6 and discharge heat to the ambient air outside of the building. In the latter case, the air flow within the walls would travel by convection in the direction opposite to the arrows shown. In either case the circulation of air within the walls could be intensified by means of a blower, as will be understood.

In the form shown in Fig. 3, the insulated panel or core 19 is continuous and has no openings for air circulation; the heat exchanger coils 20 and 21 are spread throughout the height of the spaces 22 and 23 at opposite sides of the panel 19 and said spaces 22 and 23 may be filled either with dead air or with an appropriate heat-conducting material.

In this embodiment, a separate heat exchanger 24 is provided for controlling the temperature in an air inlet duct 25 which cooperates with an air outlet duct 26 for circulating air through the occupied space 1. An additional heat exchanger 27 serves as a ground coil for the transfer of heat to or from the earth.

Here again the diagram of the refrigeration apparatus is intended to be typical of heat pumps generally. For the sake of illustration, the diagram shows the compressor 28, the receiver 29 and the expansion valves 30 and 31 connected in an arrangement suitable for the heating season in which the heat exchangers 20 and 24 serve as condensers for the delivery of heat to the space 1 and the heat exchangers 21 and 27 serve as evaporators for taking up heat from the ambient air or from the ground respectively, without attempting to illustrate the more complicated mechanism that might be deemed appropriate for reversal of the refrigeration cycle in a practical installation.

The typical diagram shows the refrigerant piping in arrangement suitable for supplying heat to the occupied space 1. While the diagrammatic illustration represents the refrigeration cycle mechanism as a single circulatory system with branch lines leading to the different heat exchangers controlled by valves 32, it will be readily understood that the components of the refrigeration apparatus might be subdivided into separate circulatory systems operated by separate compressors so that the system controlling the transfer of heat between the occupied space and the ambient air through the walls of the enclosure could be operated quite independently of the operation of the system that functions to control the temperature of the air circulation by the ducts 25 and 26.

It will also be understood that the wall construction shown in the drawings represents only the essential components thereof and that in practice the internal and external wall surfaces might be covered by any type of interior and exterior finishing coatings or layers of finishing materials.

In operation of the embodiments shown in Fig. 1, the refrigerant is compressed by the compressor 14, which causes its temperature to rise, and passes to the condenser 17 where it gives off heat to the relatively cooler air in the passage 5. This loss of heat causes the refrigerant to liquify, then it flows to the receiver 15, then through the expansion valve 16 to the evaporator coils 18 and then back to the suction side of the compressor.

The low temperature of the evaporator coils 18 reduces the temperature of the air in the passage 6 so that this air takes up heat from the ambient air through the wall panel 3. The air heated by the condenser 17 rises in the passage 5 and transmits heat through the wall panel 2 of the occupied space. Due to the relative locations of the condenser coils and the evaporator coils, a convection air current is set up in the passages 5 and 6.

Depending upon the relative temperatures at which the condenser and evaporator are operated, it is possible to widely vary the transmission of heat through the wall structure. In one instance, the air in the passage 6 may be maintained at the same temperature as the outside air while the air in the passage 5 is maintained at a temperature equal to that of the room. Then there will be no leakage of heat through the wall of the room. In another instance the air temperature in the passage 6 may be quite considerably lower than that of the outside air, while the air temperature in the passage 5 is higher than that of the room. This will cause the heat pump to utilize the outside or ambient air as a source of heat and transmit the heat to the interior of the room space 1.

In the operation of the modification shown in Fig. 3, the feature of circulating the air within the wall is omitted and the coils of the evaporator and condenser units that are located within the wall are distributed throughout the height of the wall. Here again the heat exchange units within the wall may be operated so as to prevent undesirable transmission of heat through the walls between the occupied space 1 and the ambient air, while the room temperature is mainly controlled by air circulation by the ducts 25 and 26 with the ground coil 27 being relied upon as the main source of heat and the condenser coil 24 being relied upon to transmit such heat to the circulated air.

On the other hand, the system may be operated so that transmission of heat from the ambient air to the heat exchanger 21 may be relied upon as the main source of heat and either or both heat exchangers 20 and 24 may be relied upon for transmitting heat to the interior of the room.

When it is desired to operate the system to maintain a balance between the inner and outer wall sections, 22 and 23 respectively, so that there is no heat flow through either wall 2 or wall 3, then the only heat required is that necessary to compensate for the heat transferred between sections 22 and 23 through the insulation 19 and the separate condenser 24 may be utilized as a means to bleed off the heat of compression generated by the compressor 28.

This condition prevails when heat from other sources such as people, appliances, etc. is equal to, or greater than the normal heat loss through windows, doors, floors and structure other than the heat controlling wall itself and balance, or temperature control, in the room or space 1 is maintained by increasing or decreasing the volume of ventilating air introduced by the duct 25 and regulating the air volume in accordance with the temperature of the bleed-off coil 24. This can be done by means of a variable speed blower, not shown, which is automatically controlled by the temperature of the coil 24 through the agency of suitable control apparatus that is well known and available on the present day market.

Also, if desired, the excess heat or heat of compression may be discharged from the coil 24 to any suitable cooling means utilizing city water as a heat conducting medium, and the volume of such city water may be regulated automatically according to the temperature of the coil 24.

It will be understood that numerous details of the construction shown and described herein may be altered or omitted without departing from the invention as defined in the following claims.

I claim:

1. The method of controlling the heat of a space, which comprises providing said space with a hollow wall structure having parallel inner and outer air passages forming heat exchange zones separated by an insulating panel, and providing a heat pump having a refrigerant circulating system arranged in heat exchange relation to said wall zones so as to absorb heat at one of said heat exchange zones and discharge such heat at the other said heat exchange zone.

2. The method of controlling the heat of a space which comprises providing said space with a hollow wall structure having parallel inner and outer air passages forming heat exchange zones separated by an insulating panel, providing circulation of the air from one to the other of said air passages, and providing a heat pump having a refrigerant circulating system arranged in heat exchange relation to said wall zones so as to absorb heat at one of said heat exchange zones and discharge such heat at the other said heat exchange zone.

3. A heat pump for controlling the temperature of a space, comprising an enclosure for said space including a wall formed with spaced internal, external and intermediate panels spaced apart to form parallel internal and external vertical air passages, said internal and external panels being of material of relatively good heat conducting properties and said intermediate panel being of heat insulating material, said air passages communicating with each other at their upper and lower ends, and a heat pump mechanism comprising separate heat exchangers in said air passages arranged to function as a condenser in one said air passage and as an evaporator in the other said air passage.

CARL M. SANTEE.

REFERENCES CITED

The following references are of record in the file of this patent:

UNITED STATES PATENTS

| Number | Name | Date |
| --- | --- | --- |
| 2,016,608 | McDowell | Oct. 8, 1935 |
| 2,356,778 | Morrison | Aug. 29, 1944 |
| 2,364,220 | Johnson | Dec. 5, 1944 |
| 2,387,465 | Peltier | Oct. 23, 1945 |